United States Patent [19]
Pinckney

[11] 3,914,997
[45] Oct. 28, 1975

[54] STATIC PRESSURE PROBE
[75] Inventor: Shimer Z. Pinckney, Newport News, Va.
[73] Assignee: The United States of America as represented by the United States National Aeronautics and Space Administration Office of General Counsel-Code GP, Washington, D.C.
[22] Filed: Oct. 29, 1974
[21] Appl. No.: 518,685

[52] U.S. Cl.................................. 73/182; 73/212
[51] Int. Cl.² .................... G01C 21/00; G01F 1/46
[58] Field of Search............................ 73/182, 212

[56] References Cited
UNITED STATES PATENTS
3,029,639  4/1972  Groesbeck ........................ 73/212
3,400,583  9/1968  Newport et al. .................... 73/212

FOREIGN PATENTS OR APPLICATIONS
938,081  9/1963  United Kingdom ................. 73/212

*Primary Examiner*—S. Clement Swisher
*Attorney, Agent, or Firm*—Howard J. Osborn; Wallace J. Nelson; John R. Manning

[57] ABSTRACT

An improved static pressure probe having a smaller length than conventional static probes with the same diameter and requiring no compensation for yaw angles of up to 10°.

8 Claims, 5 Drawing Figures

STATIC PRESSURE PROBE

ORIGIN OF THE DISCLOSURE

The invention described herein was made by an employee of the National Aeronautics and Space Administration and may be manufactured and used by or for the United States Government for governmental purposes without the payment of any royalties thereon or therefor.

BACKGROUND OF THE INVENTION

This invention relates generally to an apparatus for measurement of static pressure and specifically to an improved static pressure probe for use in supersonic airflow measurement on wind tunnel models.

In the field of high speed aerodynamics considerable research has been conducted attempting to optimize jet engine inlets and nozzles in which supersonic airflow exists. The resulting induced and reflected shock waves at such speeds form a close pattern with small distances between adjoining shock waves. These distances are further reduced in wind tunnel tests by the use of scale models instead of full size inlets requiring abnormally small static pressure probes to permit insertion between the shock waves. In the past, static pressure probes required a length of at least 10 diameters between the tip and the static pressure holes, which gave erroneous measurements if the probe encountered a shock wave anywhere along its length. The diameter cannot be reduced beyond a certain minimum due to the structural requirements of the probe itself and pressure response times in relation to instrumentation read data. Additionally, it is often difficult to determine the flow direction and aline the probe parallel thereto and thus an additional error in static pressure is induced when the probe is yawed or placed in other than parallel alinement with respect to the airflow.

Accordingly, an object of the present invention is to provide a new and improved static pressure probe for use in supersonic wind tunnel testing.

Another object of the present invention is a static pressure probe having the accuracy thereof unaffected by probe misalinement yaw angles of 0°–10°.

A further object of the invention is to provide a small accurate static pressure probe capable of being used in wind tunnel applications at supersonic velocities.

BRIEF SUMMARY OF THE INVENTION

According to the present invention, the foregoing and other objects are attained by providing a static probe having a conical tip connected to a more acute conical section by a tangent conic curve. Static pressure holes are situated in the probe upon the more acute conic section which is connected to a cylindrical tube support. At supersonic speeds the static pressure along the surface of the probe decreases to approximately that of freestream static pressure along the more acute cone allowing accurate pressure measurements to be made at that point.

DETAILED DESCRIPTION

A more complete appreciation of the invention and many of the attendant advantages thereof will be readily apparent as the same becomes better understood by reference to the following detailed description when considered in connection with accompanying drawings wherein.

Figure 1:
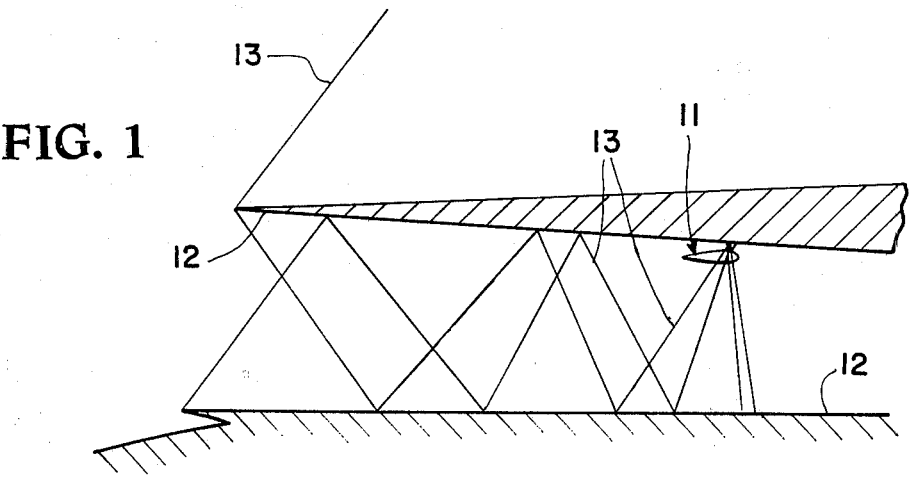
FIG. 1 is an illustration of the static pressure probe of the present invention in operative position in a high speed inlet.
Figure 2:
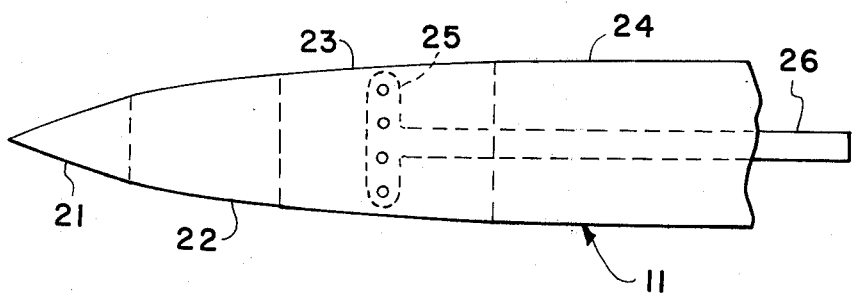
FIG. 2 is an enlarged part schematic view of the static pressure probe shown in FIG. 1.
Figure 3:
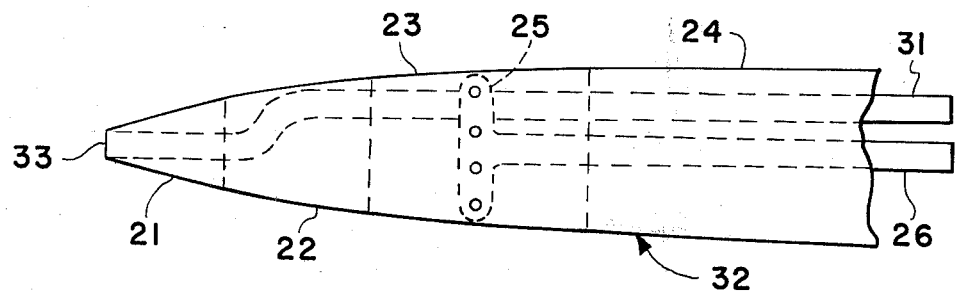
FIG. 3 is a part schematic of the static pressure probe shown in FIG. 1 in combination with a pitot or total pressure probe.
Figure 4:
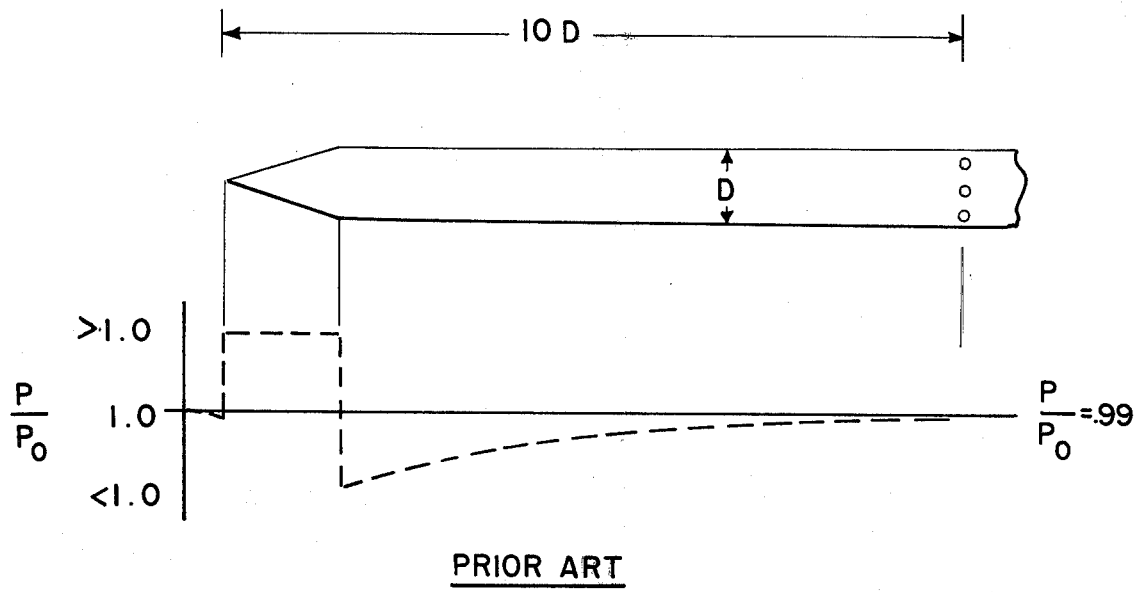
FIG. 4 is a graphical illustration of the static pressure distribution along the surface of the conventional static pressure probe shown therein.
Figure 5:
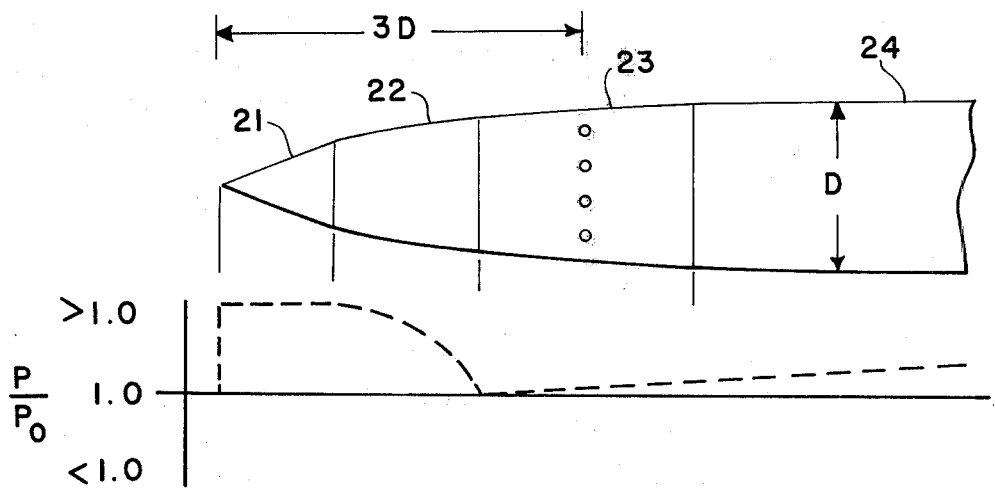
FIG. 5 is a graphical illustration of the static pressure distribution along the surface of the improved static pressure probe of the present invention.

Referring now to the drawings wherein like reference numerals designate identical parts throughout the several views. The static pressure probe 11 is depicted in FIG. 1 as mounted in a supersonic inlet 12 which produces shock waves 13. Whereas past static probes would intrude upon the reflected shock waves due to their length, the improved probe of the present invention is sufficiently short to fit within the shock waves 13. FIG. 2 depicts the 20° half angle cone section 21 connected to a 3° half angle cone section 23 through a tangent conic curve section 22. Static pressure holes 25 are located on the 3° half angle cone section 23 and are internally connected to static pressure conduit 26. The 3° cone section 23 is connected to the cylindrical support tube 24 for mounting purposes. FIG. 3 depicts the combination pitot static pressure probe 32 which adds total pressure port 33, connected to the total pressure conduit 31 to the improved static pressure probe of FIG. 2. FIGS. 4 and 5 are graphs of the static pressure along the surfaces, respectively, of a conventional probe and the improved static pressure probe of the present invention. The ratio of measured static pressure P to freestream static pressure $P_o$ is provided along side the physical shape of the probes to indicate the effect of the probes physical characteristics upon its static pressure distribution. As can be seen, the distance from the tip of the static pressure holes is on the order of 3 tube diameters, for the improved static pressure probe as compared with 10 tube diameters for the standard static pressure probe.

In the preferred embodiment the tip is a cone of 20° half angle with the second cone of a 3° half angle. The tangent conic curve section 22 provides a smooth fairing between both cones. The static pressure holes 25 are connected internally to recorders, altimeters, etc., which require static air pressure to function, known to those skilled in the art.

OPERATION

The operation should now be apparent. The improved static probe 11 is alined approximately in the direction of air flow and the static pressure pipe 26 connected to the instrument requiring static air pressure. The alinement is not particularly critical as angles of attack of up to 10° may be tolerated without a degradation of probe accuracy. As can be seen from FIG. 5 the tip 21 initiates a pressure rise that is constant as long as the tip half angle of 20° is constant. The surface pressure begins to drop as the angle decreases over the tangent conic curve section 22 such that when the curve section joins the 3° half angle cone section 23 the surface pressure approximately equals the freestream static pressure. This region, where the pressure ratio $P/P_o$ approaches 1, is greatly extended by continuing the 3° half angle cone section 23 over a distance extending to the cylindrical support tube 24. Placement of the static pressure holes 25 along the 3° cone section 23 is not particularly critical although calibration may be necessary to achieve highest accuracy at different Mach number velocities. The angles specified permit operation in the Mach 2.5 to 4.5 range although other velocity ranges may require differing angles.

Although the invention has been described relative to a specific embodiment thereof, it is not so limited and many modifications and variations thereof now will be readily apparent to those skilled in the art in the light of the above teachings. For example, size is not a critical factor and probes could be made as small as manufacturing techniques permit while retaining the necessary shape. The exact half angles of 20° and 3° could be adjusted for more accuracy in a specific Mach number range or for higher than 10° angle of attack with the same accuracy. The probe could be used in fluids other than air, which would necessitate different angles but would utilize the same principle. It is therefore to be understood that within the scope of the appended claims the invention may be practiced otherwise than as specifically described.

What is claimed as new and desired to be secured by Letters Patent of the United States is:

1. A static pressure probe for accurately sampling the freestream static pressure of a flowing fluid while reducing the adverse effects of extended probe length and probe yaw angles with respect to the freestream comprising:

a conic tip portion having a half angle pointably oriented into the direction from which the fluid to be measured is flowing to cause the flow to part evenly therearound;

a tangent conic curved portion connected to said conic tip portion to cause the static pressure along the curve to decrease toward the freestream static pressure;

a tangent cone portion connected to said tangent conic curve portion to effectively extend the distance over which the static pressure approaches that of the freestream pressure;

a static pressure measuring means to measure surface static pressure located upon said tangent cone portion such that the surface static pressure at the location approaches that of the freestream static pressure;

a cylindrical tubular body portion connected to and supporting said tangent cone portion.

2. The apparatus of claim 1 in which said static pressure measuring means are located downstream of the junction of said tangent conic curve portion and said tangent cone portion a distance approximately equal to one half the diameter of said cylindrical tube body portion.

3. The apparatus of claim 1 in which said conic tip portion is comprised of a half angle of approximately 20°.

4. The apparatus of claim 1 in which said tangent cone portion is comprised of a half angle of approximately 3°.

5. The apparatus of claim 1 in which said conic tip portion is comprised of a pitot tube means to measure stagnation pressure of said flowing fluid.

6. The apparatus of claim 1 in which said conic tip portion has a half angle approximately 20°, said tangent cone portion has a half angle of approximately 3° and said static pressure measuring means are located downstream of the junction of said tangent conic curve portion and said tangent cone portion approximately one half of the diameter of said cylindrical tube body means.

7. The apparatus of claim 1 where the flowing fluid is comprised of atmospheric air.

8. The apparatus of claim 1 where said conic tip portion includes a pitot tube means to indicate stagnation pressure of said flowing fluid.

* * * * *